G. H. LOWELL.
AUTOMATIC BRAKE SETTING MECHANISM.
APPLICATION FILED MAR. 22, 1910.
993,261.
Patented May 23, 1911.
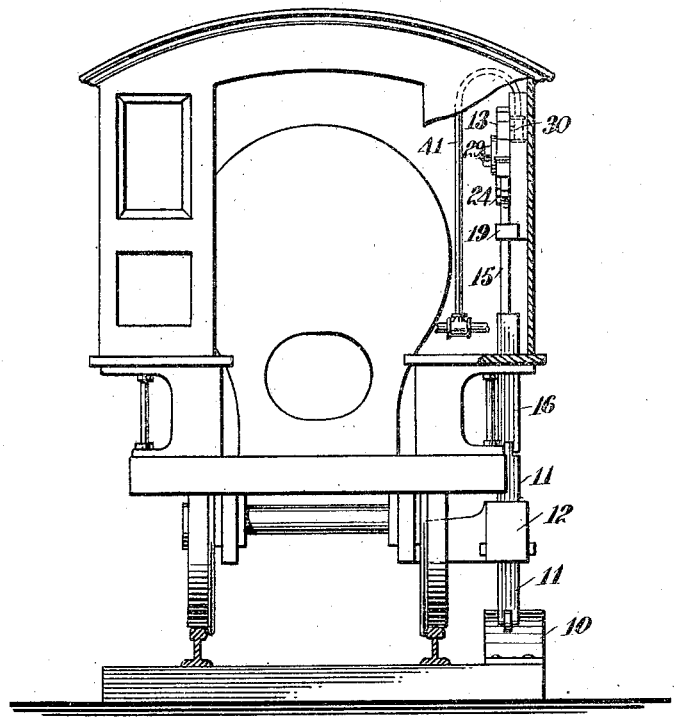
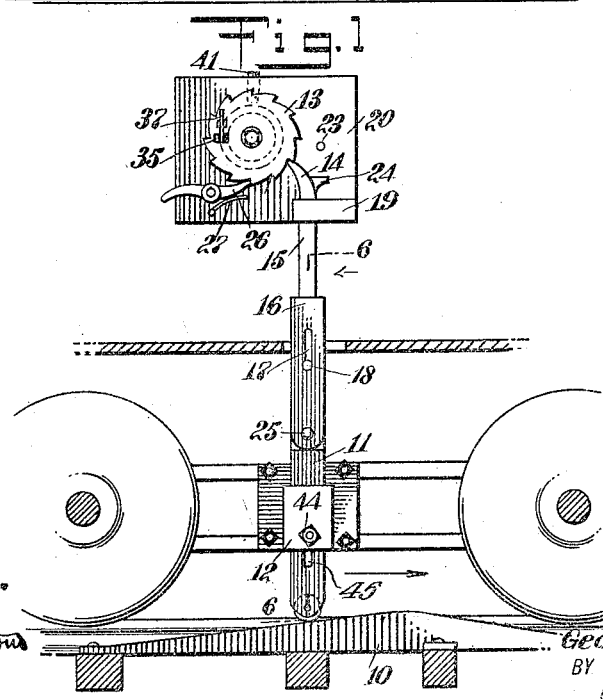
WITNESSES
INVENTOR
George H. Lowell
BY
ATTORNEYS

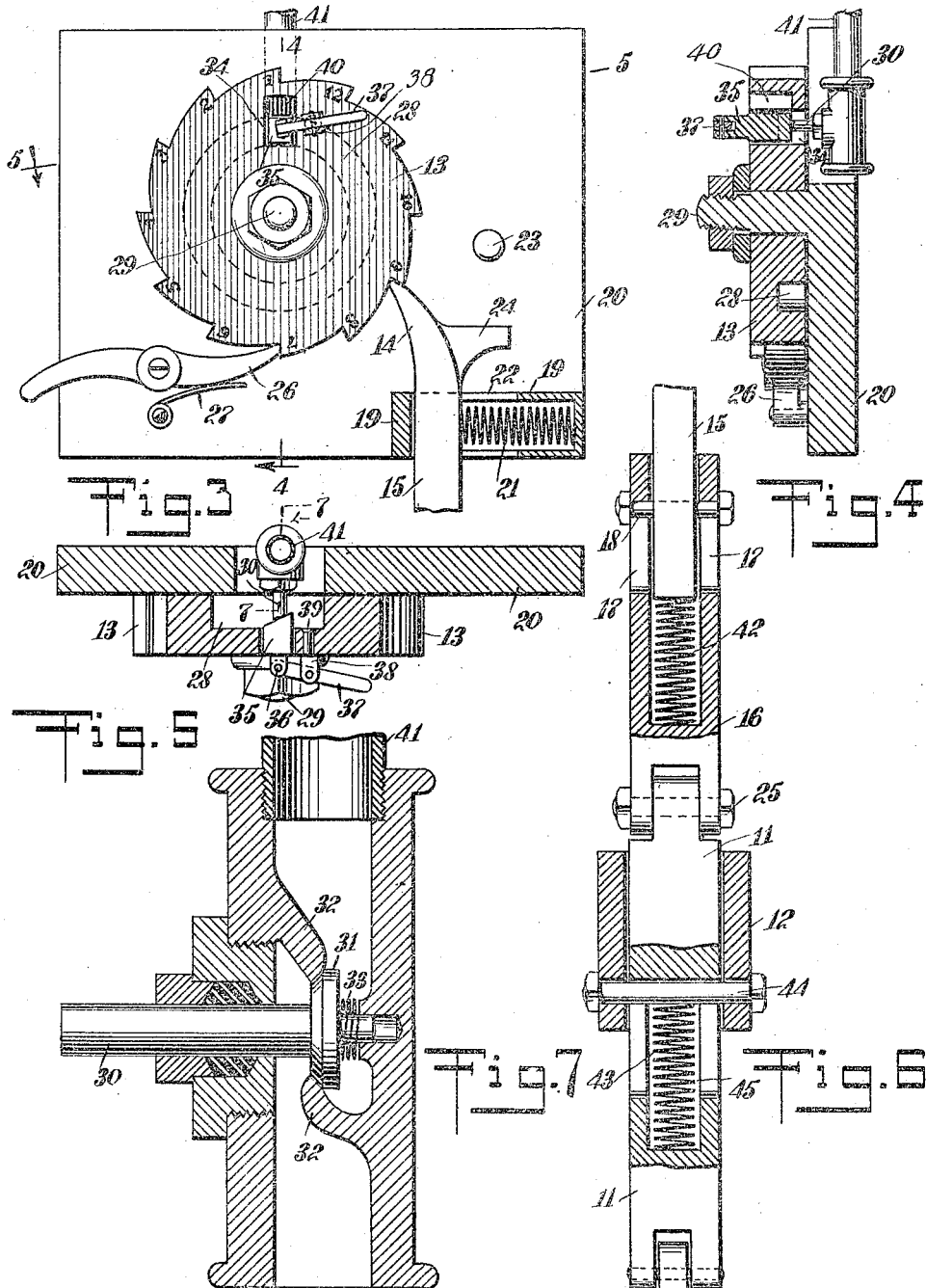

UNITED STATES PATENT OFFICE.

GEORGE H. LOWELL, OF BIRMINGHAM, ALABAMA.

AUTOMATIC BRAKE-SETTING MECHANISM.

993,261.  Specification of Letters Patent.  Patented May 23, 1911.

Application filed March 22, 1910. Serial No. 550,848.

*To all whom it may concern:*

Be it known that I, GEORGE H. LOWELL, a citizen of the United States, and a resident of Birmingham, in the county of Jefferson and State of Alabama, have invented a new and Improved Automatic Brake-Setting Mechanism, of which the following is a full, clear, and exact description.

Among the principal objects which the present invention has in view are: to provide a mechanism operable from outside the cab structure to automatically set the brakes of an engine or train; to provide a construction wherein the automatic operation may be avoided only by vigilance on the part of the engineer; and to provide a simple, effective and durable construction whereby the operation of the brake mechanism may be set with reference to arbitrary selection.

One embodiment of the present invention is disclosed in the structure illustrated in the accompanying drawings, in which like characters of reference denote corresponding parts in all the views, and in which—

Figure 1 is a rear view of a locomotive, showing the track bed the rails whereof are in section and mounted on the usual ties, and stationary deflectors for operating the automatic mechanism; Fig. 2 is a side elevation of a portion of the car truck, showing in connection therewith a side view of the mechanism for operating the brakes, movable and stationary; Fig. 3 is a front view in elevation of the selecting device used in conjunction with the present invention; Fig. 4 is a vertical section of the selecting mechanism taken on the line 4—4 in Fig. 3; Fig. 5 is a horizontal cross section taken on the line 5—5 in Fig. 3; Fig. 6 is a vertical section taken on the line 6—6 in Fig. 2, of the operating mechanism for the selecting mechanism; and Fig. 7 is a longitudinal view of a valve introduced in the air pressure pipes of the air brake system, taken on the line 7—7 in Fig. 3, adapted to be operated as an emergency valve.

The invention is adapted to provide for the prevention of accidents caused by the negligence or carelessness of engine drivers. It is particularly designed to operate for the setting of a mechanism which will be automatically operated at a given station, provided the driver through carelessness or failure does not follow directions.

At a convenient point adjacent to each station and to the various switches with which a road is provided, are rigidly mounted upon the ties constituting a portion of the road bed, gently inclined cam members 10. The upper surfaces of the cam members are sufficiently wide to provide for the swaying of the engine, upon which is mounted a plunger 11, which plunger is intended to be operated by the cam surfaces of the cams 10. The plunger 11 is held in a substantially vertical position by a bracket 12, which is provided to guide the plunger 11 in its reciprocations such as are caused by the cams 10. The reciprocation of the plunger 11 operates to rotate a ratchet wheel 13, suitably mounted within the cab of the locomotive. The ratchet wheel 13 is provided with suitable teeth, as illustrated in the drawings, and each of the teeth is preferably given a designating number. The number of teeth is unlimited, they being preferably equal to the number of stations and switches provided on the district of the road over which the particular locomotive or train is calculated to operate. The engagement of the teeth of the ratchet is effected by means of a toothed end 14 formed upon a rod 15, which is guidedly mounted within a hollow link section 16, which connects the said rod 15 and plunger 11. The link section 16 has formed in the sides thereof slots 17, 17, designed to receive and carry laterally extended pins 18, 18, which are extended from the rod 15 and which operate to guide the rod in the link and prevent the one from binding upon the other. The rod 15 is extended through a box 19, situated on a plate 20 whereon is mounted the ratchet 13. Within the box 19 is suitably mounted a spiral spring 21, the office of which is to thrust the toothed end 14 into operative engagement with the successive teeth on the ratchet 13. The box 19 is provided with an elongated slot 22, to permit the end 14 to be retracted in its rise caused by the circular lateral extension of the ratchet 13 when moved in the vertical path of the rod 15. The rod 15 is regulated and arrested in its rise by a stop 23, which is set out from the side of the plate 20 to receive an extension 24 provided on the head 14. The swing of the rod 15 is permitted by reason of the pivotal attachment of the link 16 to the plunger 11. This pivotal attachment is shown at 25 and is of any suitable form. It is to prevent the return of the ratchet 13 that a detent 26 is provided. The detent 26 is seated against the teeth of the ratchet by means of a spring 27.

The ratchet 13, as above stated, is provided with a suitable number of teeth whereby it is gradually rotated one complete revolution. In the inner face of the ratchet 13 is formed a deep inner groove 28, concentric with a pivot bolt 29 on which the ratchet 13 rotates. Extended within the inner groove 28 is a valve stem 30, the valve 31 of which is suitably seated in a partition 32, as in a globe valve. The valve is maintained in its seated position by a spring 33. Opening from the outer side of the ratchet 13 is a square perforation 34, which is adapted to hold in guided relation a cam faced head 35, which is pivoted at 36 upon a hand lever 37. The hand lever 37 is pivotally mounted between the ears of a standard 38, which is pivoted at 39 upon the ratchet 13. Extended beside the perforation 34 is a recess 40, adapted to receive the head 35 when the same is raised out of the perforation 34 and maintained out of engagement with the stem 30.

With a mechanism thus constructed, arranged and mounted the operation is as follows: As the locomotive bearing the plunger 11 passes each of the stations or switches provided with the cam 10 mounted as shown in Fig. 2 of drawings, the said plunger and parts connected therewith are lifted in a vertical direction, carrying the ratchet 13 in its rotary path one fraction of the rotation. When, in the course of the rotation of the ratchet 13 the cam faced head 35 is brought over the valve stem 30 of the valve 31, the pipe 41, connected with the air brake system, is opened to effect an emergency stop on the wheel brakes. One such operation of the plunger is effected at each of the stations, but it is not the purpose of the present invention that the brakes of a locomotive or train shall be always set automatically. It is, in fact, the intention that the engineer shall set the brakes by the usual method, and that he further shall prevent the operation of the emergency brake and the consequent discomfort and damage, by raising the cam faced head 35 so that it will not contact with the stem 30 when approaching the station for which it is set, the brake being merely provided as a safeguard to operate in the event of carelessness, inattention or disability of the engineer.

In its practical operation the apparatus is handled as follows: Presuming that a train of say, the freight variety has been stopped at a station to receive orders, which orders are to the effect that the train shall turn into the siding, say four stations in advance of that at which the order is given. Instead of trusting to the memory of the engineer the ratchet 13 is adjusted so that the cam faced head 35 is removed four stations from the location of the stem 30. At each of the intervening stations, as above set forth, the plunger 11 is raised by one of the many cams 10 provided on the road bed. On the approach of the fourth station designated as the turning off point for the train in question, the engineer is supposed to slow down, and if it be necessary for the train crew to operate the switch one of the crew goes forward and throws the same, when the train in question passes on to the siding and there awaits the oncoming meeting train which it is instructed to permit to pass. As the engineer passes from the main line on to the switch, the cam faced head 35 is raised out of its perforation 34 and thrown into the recess 40, where it is permitted to rest. In this position the succeeding stations, switches and so on, while operating the ratchet 13, do not affect the valve 31, and the apparatus to all intents and purposes is out of operation. Taking the above illustration, however, as showing the operation in the event of the carelessness of the engineer or driver, we find that as the engine passes the cam 10 located at the switch into which he has been instructed to turn, the plunger 11 and the parts connected therewith are raised to rotate the ratchet 13 and present the head 35 over the stem 30 in such manner as to throw wide the valve 31, immediately causing an emergency setting of the brakes, bringing the whole train to a standstill. The train cannot run by this station from carelessness on the part of the engineer, and such accidents are, by this apparatus, eliminated in railway operations.

In the reciprocation of the plunger 11 the link 16 and rod 15, the end of the work required and the device upon which the work is performed, necessitates a large degree of accommodation to the rise and fall of the side of the engine carrying the said mechanical parts. It is for this purpose that the rod 15 is mounted within the link 16 by means of the pins 18, as above described. It is also for this reason that the said rod 15 is supported in its extended position by a spiral spring 42 situated within the link 16, as shown most clearly in Fig. 6 of the drawings. It is for the same reason that the plunger 11 is provided with a spiral spring 43 which rests against a bolt 44 extended between the sides of the bracket 12 fixedly mounted upon the engine. The spring 43 being extended between the bottom of the perforation 45 provided in the plunger 11 and the bolt 44 which is fixedly mounted upon the locomotive, the plunger 11 is extended to its full and normal extension from the bracket 12. This action on the part of the spring 43 rests the upper extension of the plunger 11 on the bolt 44, and forms a brace against which the spring 42 thrusts in raising the rod 13 into its full upwardly extended position. In the event, however, that the engine at the moment of passing the cam 10 should sway downward on the side of the bed having the cams, so that the extension 24 on the hook end 14 strikes the stop 23 prior to the plunger 11 rising over the crown of the cam 10, the parts will give to avoid breaking the engine structure.

Having thus described my invention, what I claim as new and desire to secure by Letters Patent is:

1. An automatic brake setting mechanism, comprising a ratchet wheel mounted upon a car structure adjacent to the operating valve of an air pipe for the brake mechanism; a device mounted on ratchet wheel adapted to extend therefrom, and held thereon to operatively impinge upon said valve; means provided on said ratchet wheel for preventing the impingement of said device upon said valve; and a reciprocating member to rotate the said wheel by a succession of engagements with said wheel.

2. An automatic brake setting mechanism, comprising a ratchet disk rotatively mounted upon a car structure adjacent to the operating valve of an air pipe for the brake system, said disk being provided with an opening extended therethrough; a cam head pivotally mounted on said disk and adapted to extend through said opening to operatively engage said valve; a standard pivotally mounted upon said disk adjacent said opening; a lever pivotally mounted on said standard and fixedly connected with said cam head, said lever being arranged to be manually operated to dispose the said cam head in the path of said valve or removed therefrom; and a reciprocating member to rotate the said wheel by a succession of engagements with said wheel.

3. An automatic brake setting mechanism, comprising a ratchet disk having a plurality of radially extended ratchet teeth and having an opening extended therethrough; a spring seated reciprocating valve disposed on the brake release air pipe of the brake system, and having a stem extended into the rotary path of said opening in the disk; a standard pivotally mounted on said disk adjacent to said opening; a lever pivotally mounted on said standard and having a cam head arranged to extend through said opening to dispose the same in the path of the said valve stem to open said valve, said lever being manually operable to lift said head from said opening and to swing the same over the solid portion of the said disk; a reciprocating rod to rotate the said wheel by a succession of engagements with said wheel.

4. An automatic brake setting mechanism, comprising a ratchet disk and a movable member carried thereby arranged to be moved into and out of the path of a brake releasing valve, said disk being provided with a plurality of radially extended ratchet teeth; an operating rod for said disk embodying a plurality of telescopically arranged spring extended members; a pawl shaped end to engage the said ratchet teeth to rotate the said disk by successive impulses; and a plurality of alined guides one of which is mounted adjacent to said disk.

5. An automatic brake setting mechanism, comprising a ratchet disk and a movable member carried thereby arranged to be moved into and out of the path of a brake releasing valve, said disk being provided with a plurality of radially extended ratchet teeth; an operating rod for said disk embodying a plurality of telescopically arranged spring extended members; a pawl shaped end to engage the said ratchet teeth to rotate the said disk by successive impulses; a plurality of alined guides one of which is mounted adjacent to said disk; a spring for holding said pawl end in contact with said ratchet teeth; and a spring actuated pawl to engage said teeth to prevent the retraction of said disk.

In testimony whereof I have signed my name to this specification in the presence of two subscribing witnesses.

GEO. H. LOWELL.

Witnesses:
JNO. P. RUSSELL,
MARK MAULEY.